(12) United States Patent
Doumas

(10) Patent No.: US 8,757,096 B2
(45) Date of Patent: Jun. 24, 2014

(54) ANIMAL DRYING APPARATUS AND METHODS THEREOF

(76) Inventor: Christopher Doumas, Rumson, NJ (US)

(*) Notice: Subject to any disclaimer, the term of this patent is extended or adjusted under 35 U.S.C. 154(b) by 156 days.

(21) Appl. No.: 13/154,637

(22) Filed: Jun. 7, 2011

(65) Prior Publication Data

US 2012/0312246 A1 Dec. 13, 2012

(51) Int. Cl.
*A01K 1/02* (2006.01)
*A01K 13/00* (2006.01)

(52) U.S. Cl.
USPC .......................................... 119/606; 119/678

(58) Field of Classification Search
USPC ......... 119/606, 601, 668, 671, 677, 678, 448,
119/474, 498, 499
See application file for complete search history.

(56) References Cited

U.S. PATENT DOCUMENTS

| | | | | |
|---|---|---|---|---|
| 3,175,534 A * | 3/1965 | Pollard | | 119/174 |
| 3,596,636 A * | 8/1971 | Stobaugh | | 119/174 |
| 3,962,993 A * | 6/1976 | Dattilo | | 119/500 |
| 3,985,102 A * | 10/1976 | Yonezawa | | 119/416 |
| 4,057,032 A * | 11/1977 | Dimitriadis | | 119/671 |
| 4,314,410 A * | 2/1982 | Nichols | | 34/202 |
| 4,559,903 A * | 12/1985 | Bloom et al. | | 119/416 |
| 4,730,576 A * | 3/1988 | Yoshikawa | | 119/673 |
| 4,781,147 A * | 11/1988 | Delino, Jr. | | 119/453 |
| 4,803,951 A * | 2/1989 | Davis | | 119/497 |
| 4,858,561 A * | 8/1989 | Springer | | 119/165 |
| 4,977,690 A * | 12/1990 | Davis, Jr. | | 34/523 |
| 5,003,923 A * | 4/1991 | Morgan | | 119/482 |
| 5,134,972 A * | 8/1992 | Compagnucci | | 119/165 |
| 5,140,947 A * | 8/1992 | Bruce | | 119/677 |
| 5,283,962 A * | 2/1994 | Humann | | 34/202 |
| 5,435,269 A * | 7/1995 | Chen | | 119/673 |
| 5,655,478 A * | 8/1997 | Kiera | | 119/165 |
| 5,862,548 A * | 1/1999 | Gerhart | | 5/93.1 |
| 6,055,937 A * | 5/2000 | Korpi | | 119/452 |
| 6,058,886 A * | 5/2000 | Haines | | 119/601 |
| 6,403,922 B1 * | 6/2002 | Hawks et al. | | 219/385 |
| 6,425,347 B1 * | 7/2002 | Bogner et al. | | 119/318 |
| 6,446,577 B1 * | 9/2002 | Salahor | | 119/497 |
| 6,490,995 B2 * | 12/2002 | Greene, Jr. | | 119/496 |
| 6,581,545 B1 * | 6/2003 | Foster | | 119/482 |
| 6,637,374 B2 * | 10/2003 | Hawks et al. | | 119/448 |
| 6,866,009 B2 * | 3/2005 | Smith et al. | | 119/840 |
| 6,883,463 B2 * | 4/2005 | Link | | 119/474 |
| 6,923,144 B2 * | 8/2005 | Little | | 119/482 |
| D515,746 S * | 2/2006 | Sequino | | D30/119 |
| 7,025,019 B2 * | 4/2006 | Axelrod et al. | | 119/499 |
| 7,322,315 B2 * | 1/2008 | Brewer et al. | | 119/498 |
| 7,347,164 B2 * | 3/2008 | Axelrod et al. | | 119/499 |
| 7,640,890 B1 * | 1/2010 | Maynard | | 119/484 |
| 7,753,003 B2 * | 7/2010 | Farmer et al. | | 119/499 |
| 7,789,044 B2 * | 9/2010 | McGrade | | 119/496 |

(Continued)

*Primary Examiner* — Yvonne Abbott
(74) *Attorney, Agent, or Firm* — Jon Fallon, Esq.; Michael P. Kochka, Esq.

(57) ABSTRACT

Embodiments of the present invention generally relate to an animal drying apparatus and methods thereof. More specifically, embodiments of the present invention relate to a portable apparatus enabling a pet owner to quickly and efficiently dry an animal after a bath, the rain, a swim, or the like. Embodiments of the present invention relate to an animal drying apparatus comprising a housing having a top surface, a floor and a plurality of sidewalls, an entry for enabling an animal to gain access to the interior of the housing, the entry positioned through one of the plurality of sidewalls, and a drying element positioned to assist in drying a wet animal positioned in the interior of the housing.

14 Claims, 4 Drawing Sheets

(56) References Cited

U.S. PATENT DOCUMENTS

| | | | |
|---|---|---|---|
| 7,802,540 B2* | 9/2010 | Jakubowski et al. | 119/499 |
| 8,061,304 B1* | 11/2011 | Ramsay et al. | 119/671 |
| 8,079,328 B2* | 12/2011 | Lott | 119/499 |
| 8,117,993 B2* | 2/2012 | Farmer et al. | 119/499 |
| 8,186,307 B2* | 5/2012 | Moharram et al. | 119/651 |
| 8,291,866 B2* | 10/2012 | Cauchy et al. | 119/500 |
| 8,297,230 B2* | 10/2012 | Ferrer et al. | 119/165 |
| 2003/0127059 A1* | 7/2003 | Smith et al. | 119/496 |
| 2005/0229866 A1* | 10/2005 | Simpson et al. | 119/499 |
| 2007/0251463 A1* | 11/2007 | Lu | 119/452 |
| 2007/0295281 A1* | 12/2007 | Fortson et al. | 119/601 |
| 2009/0235871 A1* | 9/2009 | Andreas et al. | 119/601 |

* cited by examiner

ANIMAL DRYING APPARATUS AND METHODS THEREOF

BACKGROUND OF THE INVENTION

1. Field of the Invention

Embodiments of the present invention generally relate to an animal drying apparatus and methods thereof. More specifically, embodiments of the present invention relate to a portable apparatus enabling a pet owner to quickly and efficiently dry an animal after a bath, the rain, a swim, or the like.

2. Description of the Related Art

It is not uncommon for companion animals, i.e., pets, such as dogs, cats, etc., to get wet. Whether from bathing, being out in the rain, going for a swim in a lake or pool, laying on wet grass, or the like, most animals make an utter mess when allowed to roam freely in a residence or vehicle when wet. Thus, most pet owners attempt to dry their pets off before allowing them to roam free.

Currently, the choices available for drying a wet animal are limited to: (1) let the animal air-dry, (2) dry the animal with a towel or cloth, or (3) use an electric forced-hot air apparatus (i.e., a hair dryer). However, each of these options possess significant disadvantages and are quite impractical.

Allowing an animal to air-dry generally also requires the animal avoid any additional sources of water while drying, which if outside, may be difficult. In addition, a wet animal left outside to air dry may also try to run and play in areas with dirt or debris, which would likely make the animal filthy. Even if left inside a bathroom after a bath, an animal may likely attempt to remove some of the moisture on its fur by shaking it off, which would likely make a mess of the bathroom (or bath area).

Using a towel or cloth to dry an animal can be quite difficult. Generally, a pet owner would attempt to wrap a towel around all or part of the animal's body, which requires the animal stay still (or be held still) for a significant period of time. Even if this method is successful in drying the animal's body, attempting to hold the animal still while drying its legs, tail, head, etc., can be near impossible unless the animal is extensively trained. In addition to the difficulties, it is near impossible for someone to dry an animal in this fashion without getting substantially wet themselves.

Drying an animal an electric forced-hot air apparatus has multiple disadvantages. One disadvantage is that most of such devices are very noisy, which can badly frighten an animal. Another disadvantage, which is similar to the issue with towels described above, it can be extremely difficult to get the animal to hold still during the process of blowing the hot air on its fur; and even more so because the person drying the animal generally only has one hand to hold the animal, while the other holds the forced-hot air apparatus.

As such, there is a need for an animal drying apparatus and methods of operating the same.

SUMMARY OF THE INVENTION

Embodiments of the present invention generally relate to an animal drying apparatus and methods thereof. More specifically, embodiments of the present invention relate to a portable apparatus enabling a pet owner to quickly and efficiently dry an animal after a bath, the rain, a swim, or the like.

Embodiments of the present invention relate to an animal drying apparatus comprising a housing having a top surface, a floor and a plurality of sidewalls, an entry for enabling an animal to gain access to the interior of the housing, the entry positioned through one of the plurality of sidewalls, and a drying element positioned to assist in drying a wet animal positioned in the interior of the housing.

In another embodiment of the present invention, an animal drying apparatus comprises a substantially unitary material having a plurality of sections, each of the sections adaptable to form a housing around a frame, an entry for enabling an animal to gain access to the interior of the housing and a drying element positioned to assist in drying a wet animal positioned in the interior of the housing when formed.

In yet another embodiment, a kit for drying an animal comprises an animal drying apparatus comprising: a substantially unitary material having a plurality of sections, each of the sections adaptable to form a housing around a frame, an entry for enabling an animal to gain access to the interior of the housing, and a drying element positioned to assist in drying a wet animal positioned in the interior of the housing when formed; the frame comprising a collapsible structure having at least a pair of longitudinal bars, a pair of axial bars, and a plurality of vertical bars; and a means for carrying the animal drying apparatus and the frame.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
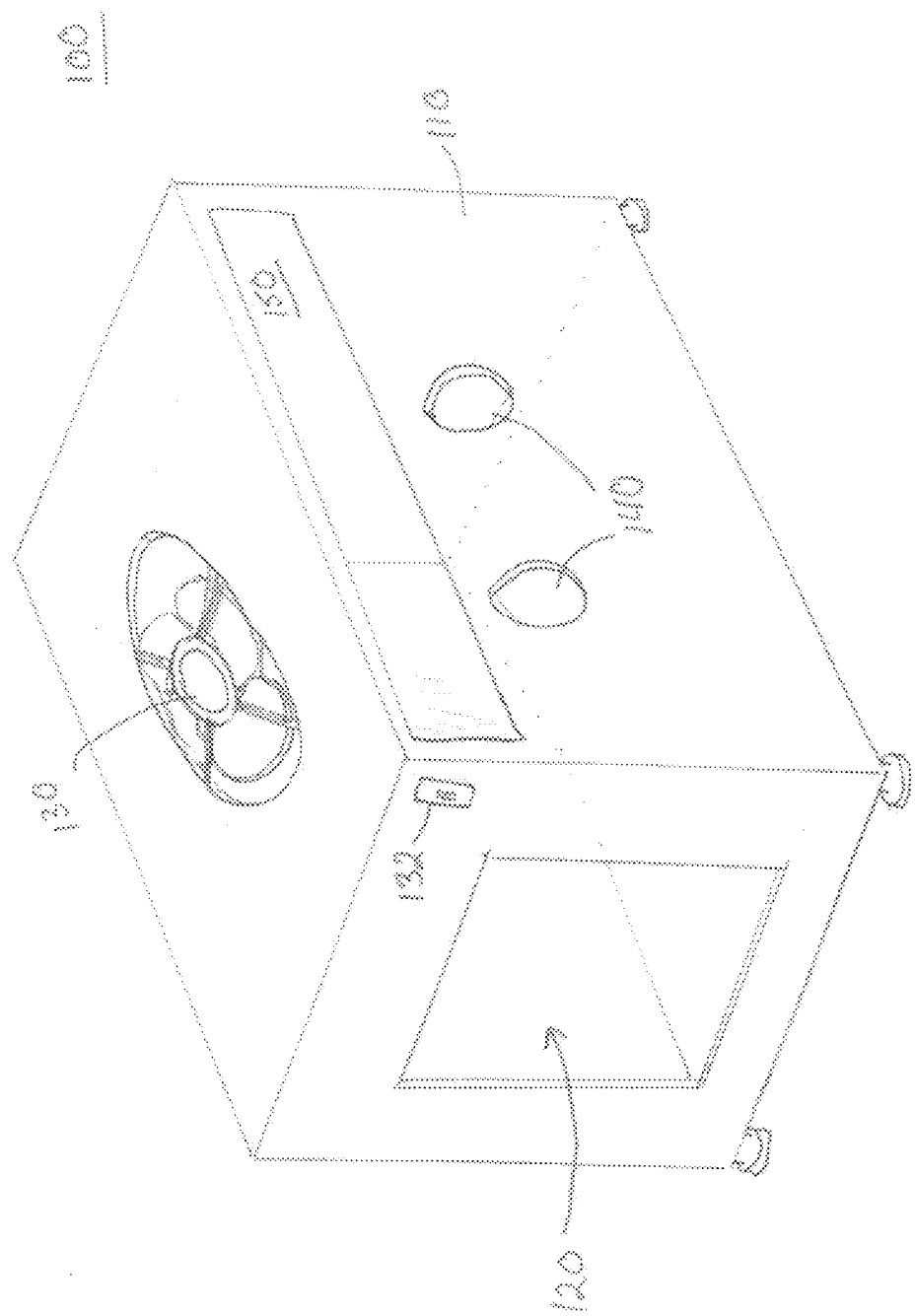
FIG. 1 depicts a perspective view of an animal drying apparatus in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention generally relate to an animal drying apparatus and methods thereof. More specifically, embodiments of the present invention relate to a portable apparatus enabling a pet owner to quickly and efficiently dry an animal after a bath, the rain, a swim, or the like.

FIG. 1 depicts a perspective view of an animal drying apparatus in accordance with one embodiment of the present invention. An animal drying apparatus 100 generally comprises a housing 110, an entry 120 for gaining access to the interior of the housing, and a drying element 130. Although shown as a rectangular-shaped voluminous structure, it should be appreciated that embodiments of the present invention may take any shape or size, provided the elements required by embodiments of the present invention are present therein.

The housing 110 generally comprises any material suitable for embodiments of the present invention. In some embodiments, the housing 110 comprises a material having significant liquid absorption properties. In some embodiments, the housing 110 comprises a porous textile material capable of absorbing a large volume of water and similar liquids per cubic inch of the material. Suitable materials include any material having a water absorption property of at least 5.0%, defined as the relationship of the volume of the weight of the liquid absorbed to the weight of the dry material, per volume, expressed as a percentage in accordance with testing standard ATSM C20-00. In other embodiments of the present invention, the housing 110 comprises an absorbent fabric material, such as a chamois cloth, woven cotton, or the like.

In certain embodiments, the housing 110 may comprise a combination of materials, with absorbent materials present where liquid is most likely going to accumulate within the animal drying apparatus 100 when in use, e.g. on the floor surface. The other materials utilized within the housing may comprise any type of natural or synthetic fabric, wood-based materials, metal-based materials, polymers, or the like. In one embodiment, the floor surface may comprise a grated structure or similar water permeable surface, optionally having a covering thereover, and the housing 110 may further comprise a catch basin or similar water collection means positioned underneath the floor. In another embodiment, the material of the housing 110 may be washing machine and/or dryer safe, such that it can detach and quickly and easily be cleaned between uses.

The entry 120 for gaining access to the interior of the housing 110 may be positioned through any of the sidewalls of the housing 110. Although only one entry 120 is shown in the Figure, embodiments of the present invention may provide for two or more entries, to allow for easy passage through the housing 110 by the animal. In many embodiments, where the housing 110 is substantially rectangular the entry 120 may be positioned through one of the narrower surfaces, as shown in the Figure. The size and shape of the entry may vary depending on the size of the animal for which a particular embodiment is designed.

Optionally, the entry 120 may comprise a door, flap or other closure (not shown) for preventing an animal's undesired access to the animal drying apparatus 100. The door on the entry 120 may also be utilized to help keep an animal inside the animal drying apparatus 100. In such embodiments, the door may be provided with a lock, latch or the like.

The drying element 130 may comprise any type of drying device suitable for embodiments of the present invention. In one embodiment, the drying device 130 comprises a heated forced-hot air apparatus. In one exemplary embodiment, the drying device 130 comprises a heated fan, having an air volume capacity of between about 30 cubic feet per minute (CFM) and about 200 CFM, having a heating element therein of between about 200 Watts and about 2000 Watts.

In other embodiments of the present invention, the drying element 130 may comprise any heat producing element and/or any forced air device. In one embodiment, the drying element 130 may comprise a blower fan producing between about 50 CFM to about 250 CFM of air. In another embodiment, the drying element 130 comprises an electrical heat coil, whereby a power source would heat metal coils producing heat. In such embodiment, the heat produced from such metal coils may be up to about 160 degrees Fahrenheit on a high setting. While such temperatures may be measured on the surface of the coils, natural or forced convection would dictate the temperature felt by the animal inside the animal drying apparatus 100. Similarly, the drying element 130 may comprise any type of heat lamp or heating coils, for example, as used in the food preparation industry.

Although the heating element 130 is shown positioned on the top surface of the housing, various embodiments of the present invention allow for the heating element 130, or multiple heating elements, to be positioned anywhere along any of the surfaces of the housing 110. For example, in one embodiment, a first heating element 130 may be provided on the top surface and another heating element is provided on the floor of the housing. In such exemplary embodiment, the first heating element 130 may comprise a heated fan, whereas the heating element on the floor comprises a heated surface or similar warming element.

In many embodiments, the heating element 130 may require a power source in order to operate. In many embodiments, the power source (not shown) may comprise a common electrical outlet, whereby the heating element 130 comprises a power cord for accessing the same. In other embodiments, the power source may comprise one or more batteries or similar capacitive device. In alternative embodiments, the heating element 130 may be powered by any of solar power, wind power (if outside), fuel-based power, or the like. Where power is required, the heating element 130 may comprise one or more control devices 132. The control device 132 may comprise a switch, dial, computer-based control system or the like, and may regulate the temperature, speed, etc., of the heating element 130.

Certain embodiments of the present invention may comprise one or more optional features. In one embodiment, the animal drying apparatus 100 optionally comprises at least one access portal 140. As shown in the Figure, the access portal 140 may be sized and shaped allowing a user of the animal drying apparatus 100 to extend arms therethrough. By providing access to the interior of the housing 110, a user may be able to assist in drying the animal therein, using a brush, a towel/cloth, holding the animal steady, or the like.

Depending on the opacity of the material of the housing 110, the animal drying apparatus 100 may also comprise an optional viewing window 150. With such viewing window 150, a user may be able to monitor the animal while inside the animal drying apparatus 100. In addition, where an access portal 140 is provided, the viewing window 150 may allow the user to see the animal while assisting in the drying process.

Other features, not shown in the Figure, may include a food station within the housing 110 to keep the animal occupied while being dried. Similarly, in certain alternative embodiments, the animal drying apparatus 100 may comprise a means for adapting the entry 120 to the backside of an exterior animal door—that is, as an animal enters the house through a designated animal entryway, the animal immediately enters the animal drying apparatus 100. Such means for adapting the entry may comprise any mechanical connection means to align the entry 120 over the animal door and to prevent the animal drying apparatus 100 from sliding back if the animal is running through the animal door.

Figure 2:
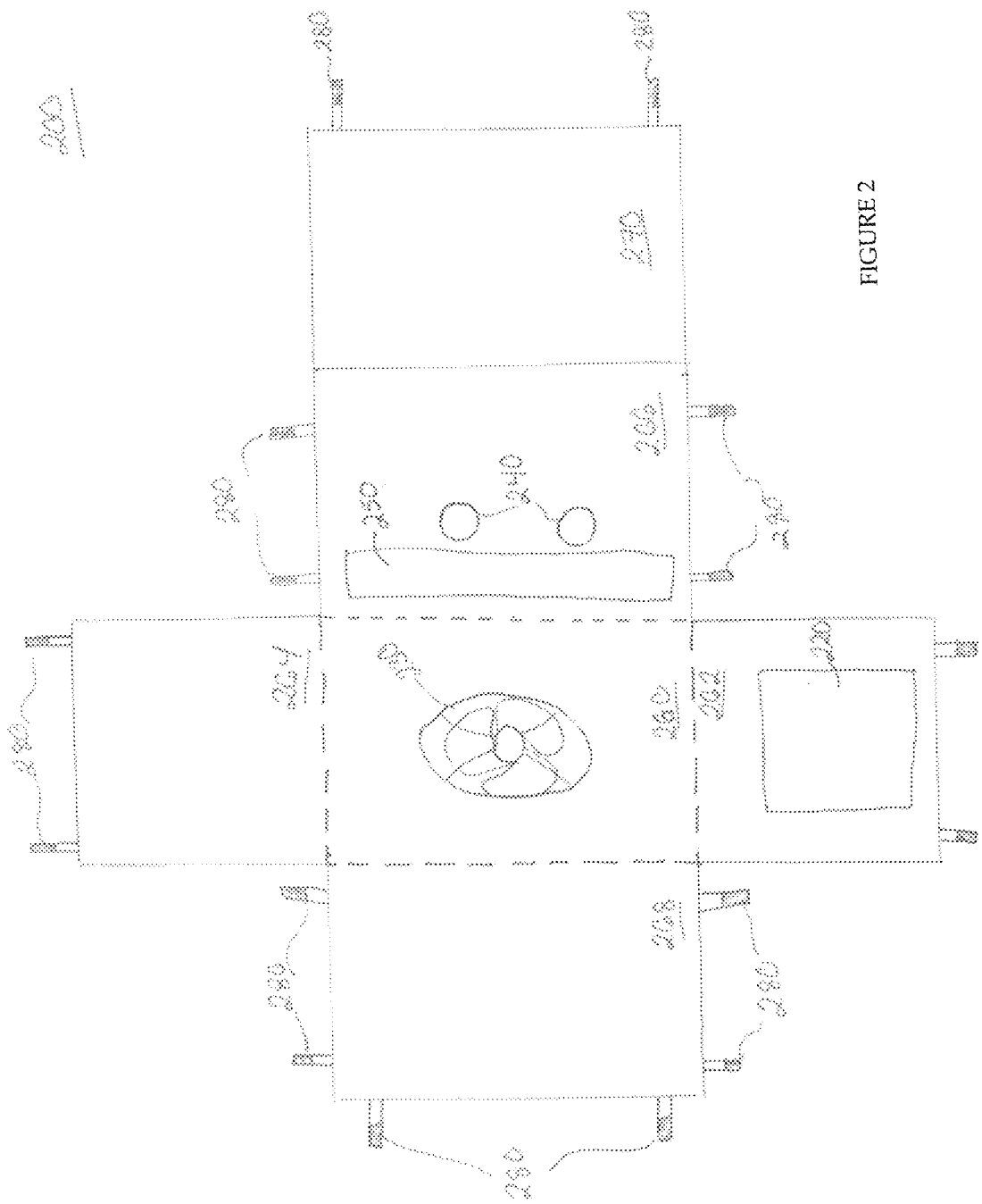
FIG. 2 depicts a top view of a disassembled animal drying apparatus in accordance with one embodiment of the present invention.

FIG. 2 depicts a top view of a disassembled animal drying apparatus in accordance with one embodiment of the present invention. As shown in the Figure, an animal drying apparatus 200 may not conform to any specified structure, but rather be provided in the form of a substantially flat fabric material, capable of adapting to a structure or frame. A description of two exemplary types of structural frames is provided infra.

Similar to the embodiment shown in FIG. 1, the animal drying apparatus 200 generally comprises an entry 220, a heating element 230, and a plurality of sides—a top 260, front 262, back 264, right 268, left 268 and floor 270—that when assembled create the surfaces of a housing. The embodiment depicted in the Figure similarly comprises the optional access portals 240 and viewing window 250.

In some embodiments of the present invention each of the sides is provided with at least one retaining mechanism 280. The retaining mechanism 280 comprises any means to adapt and retain the various sides of the animal drying apparatus 200 to a structure (not shown). In one embodiment, the retaining mechanism 280 comprises at least one of a mechanical fastener, hook-and-loop fasteners, straps, tie-downs, or combinations thereof. In an alternative embodiment, the retaining mechanism may be provided around the exterior perimeter of each of the sides, and may comprise hook-and-loop fasteners, zippers, or the like. In a further embodiment, the retaining mechanism 280 may comprise one or more pocket-like structures designed to accept one or more posts of a frame structure, similar to the setup of a camping tent.

When the animal drying apparatus 200 is provided without a structural frame, as shown in the Figure, the animal drying apparatus may be folded and conveniently stored. In one embodiment of the present invention, the animal drying apparatus 200 is provided as a component of a kit, which further comprises a collapsible frame, for example, as described hereinbelow, as well as a carrying apparatus (e.g., a bag, box, etc.).

Figure 3:
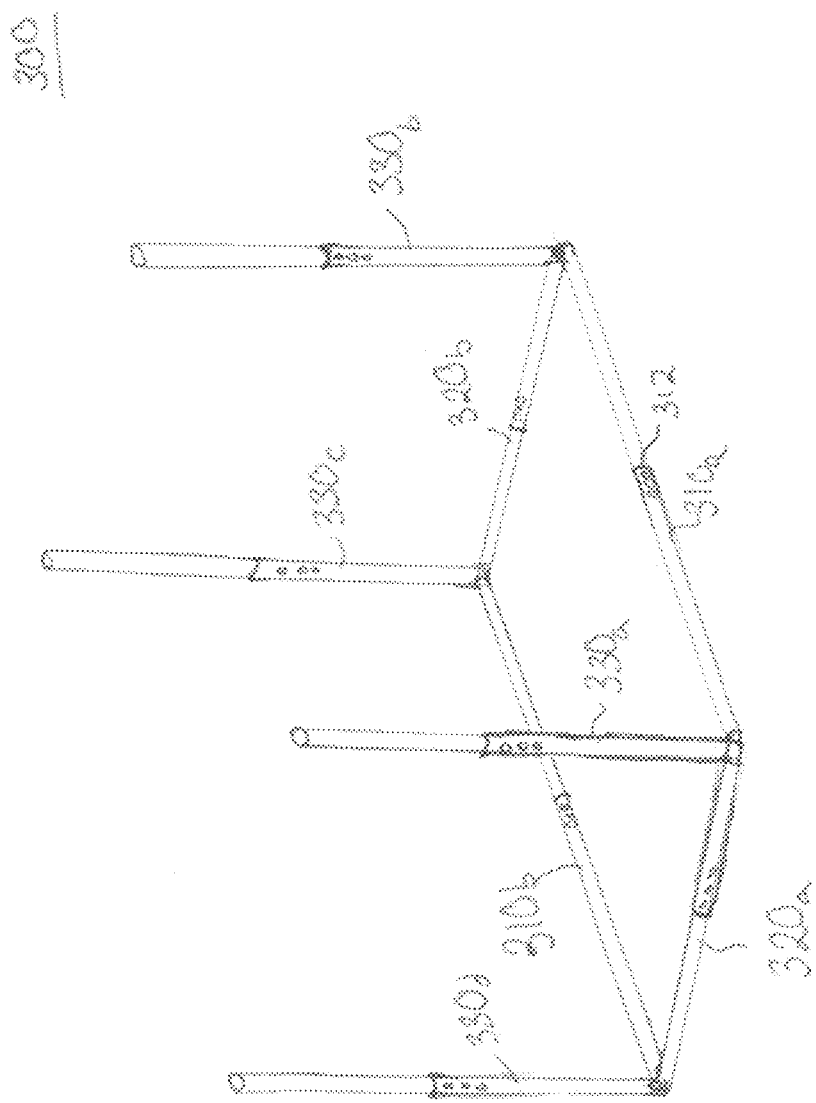
FIG. 3 depicts a perspective view of a frame for an animal drying apparatus in accordance with one embodiment of the present invention.

FIG. 3 depicts a perspective view of a frame for an animal drying apparatus in accordance with one embodiment of the present invention. As shown in the Figure, the frame 300 comprises a structure suitable for supporting the animal drying apparatus described herein. The frame 300 generally comprises a pair of longitudinal bars 312a, 312b, a pair of axial bars 320a, 320b, and a plurality of vertical bars 330a-d. Optionally, the frame 300 may also comprise a set of longitudinal and axial bars along a top end of the vertical bars. Although four vertical bars 330a-d are shown, any number of vertical bars 330 may be utilized within embodiments of the present invention.

In one embodiment, one or more of the bars of the frame 300 may be collapsible and/or telescopic. In the embodiment shown, each of the bars comprises a locking device 312 for extending and retracting the bars. By enabling the bars to telescope, a user may be able to more easily travel with such a frame 300. Similarly, each of the vertical bars 300 may be rotatably collapsible into the frame structure 300 to substantially allow the frame 300 to lay flat. In an alternative embodiment, for example, if each of the bars comprised movable piping (e.g., PVC piping) and similar joints, the frame could easily be assembled and disassembled when desired.

Figure 4:
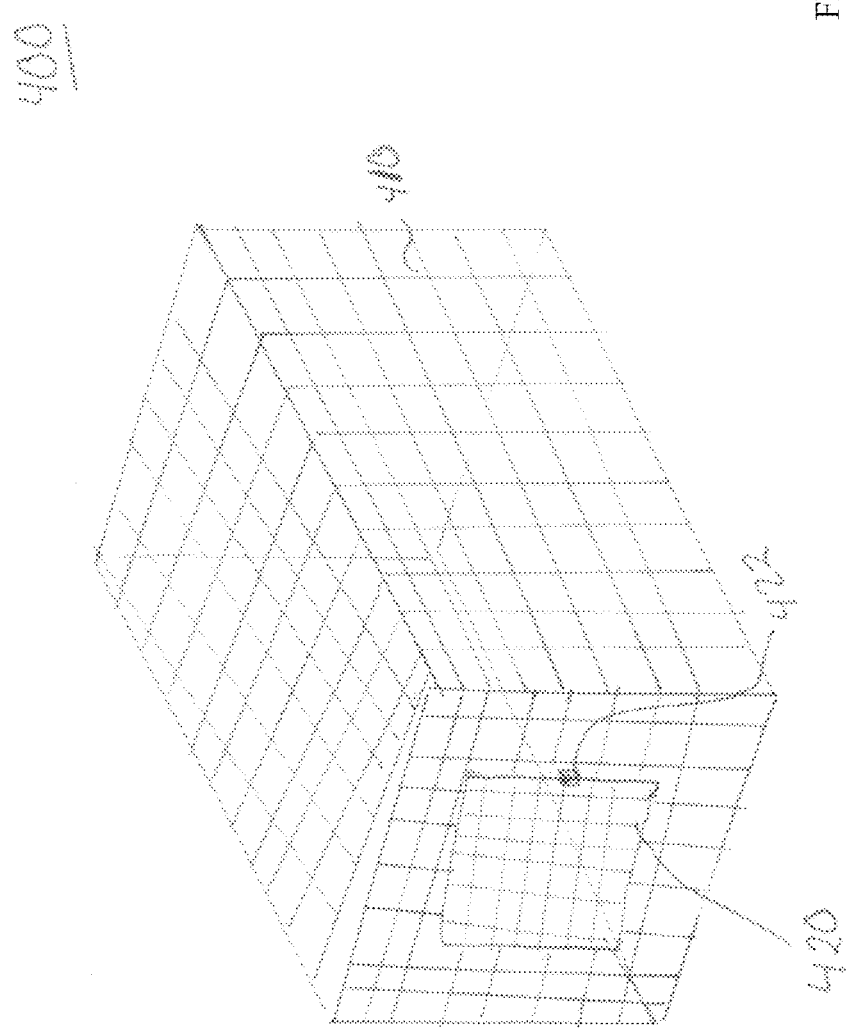
FIG. 4 depicts a perspective view of another frame for an animal drying apparatus in accordance with one embodiment of the present invention.

FIG. 4 depicts a perspective view of another frame for an animal drying apparatus in accordance with one embodiment of the present invention. The frame 400 generally comprises a cage-like design, comprising a plurality of perpendicular rigid bars 410 making up a rigid structure. As shown in the Figure, the frame 400 may generally comprise a door 420 having a locking mechanism 422 thereon. In an alternative embodiment of the present invention, the frame 400 may exist in the form of a cage, and the components of the elements of the animal drying apparatus, for example, the drying element, the access portal and/or the entry, may be built directly into the cage.

Embodiments of the present invention appreciate that extant structures, such as a dog cage, a pet carrier, or the like, may also provide suitable structure for an animal drying apparatus. In such embodiments, the animal may be more receptive to being dried therein as it is already familiar with interior of the structure and such structure likely possesses the animal's scent.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. For example, an element disclosed by one embodiment of the present invention may be included in any other disclosed embodiment, where suitable. All such modifications and variations are intended to be included herein within the scope of this disclosure and the present invention and protected by the following claims.

What is claimed is:

1. An animal drying apparatus comprising:
    a housing comprising fabric adapted to drape over a separate pet frame, the housing having a top surface and a plurality of sidewalls;
    an entry for enabling an animal to gain access to the interior of the housing, the entry positioned through one of the plurality of sidewalls; and
    a drying element comprising a fan, the fan positioned to assist in drying a wet animal positioned in the interior of the housing, the fan detachably attached to the housing.

2. The animal drying apparatus of claim 1, further comprising an access portal through one of the plurality of sidewalls for allowing a user to access the interior of the housing.

3. The animal drying apparatus of claim 1, further comprising a viewing window through one of the plurality of sidewalls for allowing a user to view the interior of the housing.

4. The animal drying apparatus of claim 1, wherein the fan comprises a heated fan.

5. The animal drying apparatus of claim 4, wherein the heated fan comprises a voluminous air capacity of between about 30 CFM and about 200 CFM, and a heating element positioned therein utilizing between about 200 Watts and about 2000 Watts.

6. The animal drying apparatus of claim 1, wherein the entry is adaptable to an interior side of a pet door inside a residence.

7. An animal drying apparatus comprising:
    a substantially unitary fabric material having a plurality of sections, each of the sections adaptable to form a housing, the housing adapted to drape over a separate pet frame;
    an entry for enabling an animal to gain access to the interior of the housing; and
    a drying element comprising a fan, the fan positioned to assist in drying a wet animal positioned in the interior of the housing when formed, the fan detachably attached to the housing.

8. The animal drying apparatus of claim 7, further comprising an access portal through one of the sections for allowing a user to access the interior of the housing when formed.

9. The animal drying apparatus of claim 7, further comprising a viewing window through one of the sections for allowing a user to view the interior of the housing when formed.

10. The animal drying apparatus of claim 7, wherein the fan comprises a heated fan.

11. The animal drying apparatus of claim 10, wherein the heated fan comprises a voluminous air capacity of between about 30 CFM and about 200 CFM, and a heating element positioned therein utilizing between about 200 Watts and about 2000 Watts.

12. A kit for drying an animal comprising:
an animal drying apparatus comprising:
- a substantially unitary fabric material having a plurality of sections, each of the sections adaptable to form a housing, the housing adapted to drape over a pet frame, the frame adapted to hold an animal;
- an entry for enabling an animal to gain access to the interior of the housing; and
- a drying element comprising a fan, the fan positioned to assist in drying a wet animal positioned in the interior of the housing when formed, the fan detachably attached to the housing;
- the pet frame comprising a collapsible structure having at least a pair of longitudinal bars, a pair of axial bars, and a plurality of vertical bars; and a means for carrying the animal drying apparatus and the frame.

13. The kit of claim 12, wherein each of the longitudinal bars, axial bars, and vertical bars are telescoping.

14. The kit of claim 13, wherein the vertical bars are rotatably collapsible into a center of the frame.

* * * * *